United States Patent [19]

Althausen et al.

[11] 3,924,989
[45] Dec. 9, 1975

[54] MACHINE FOR PRODUCING MOLDINGS FROM CHEMICAL COMPONENTS WHICH REACT QUICKLY WITH ONE ANOTHER

[75] Inventors: Ferdinand Althausen, Neuenkirchen-Seelscheid; Heinrich Boden, Opladen; Heinz Ersfeld, Bergisch-Neukirchen; Lothar Klier, Opladen; Reiner Raffel, St. Augustin; Walter Schneider, Bensberg, all of Germany

[73] Assignees: Bayer Aktiengesellschaft; Maschinenfabrik Hennecke GmbH, both of Leverkusen Bayerwerk, Germany

[22] Filed: Oct. 18, 1973

[21] Appl. No.: 407,754

[30] Foreign Application Priority Data
Oct. 25, 1972 Germany............................ 2252201

[52] U.S. Cl. .................... 425/130; 259/4; 425/188; 425/192; 425/205; 425/817 R
[51] Int. Cl.[2] ......................................... B29D 27/04
[58] Field of Search............ 425/200, 4 R, 130, 188, 425/190, 192, 202, 205, 204, 447, 448, 449, 425/817 R, 467, 206, 256, 257, 242 R; 259/4, 180, 150; 264/45.1

[56] References Cited
UNITED STATES PATENTS

| | | | |
|---|---|---|---|
| 829,127 | 8/1906 | Strauss................................ | 259/150 |
| 832,400 | 10/1906 | Lyons................................. | 259/150 |
| 3,343,215 | 9/1967 | Vinkeloe............................. | 425/467 |
| 3,459,407 | 8/1969 | Hazlehurst et al...................... | 259/4 |
| 3,476,521 | 11/1969 | Wise................................... | 259/4 X |
| 3,605,183 | 9/1971 | Heckrotte....................... | 425/447 X |
| 3,709,640 | 1/1973 | Boden et al............................. | 425/4 |

*Primary Examiner*—Robert D. Baldwin
*Assistant Examiner*—Mark Rosenbaum
*Attorney, Agent, or Firm*—Lawrence S. Pope

[57] ABSTRACT

An apparatus for producing moldings from chemical components comprises a mold with an associated mixing chamber which communicates at its outlet and with the mold cavity, wherein this communication is supplied with a remixing system comprising an arrangement of channels provided with branches and junctions.

12 Claims, 4 Drawing Figures

MACHINE FOR PRODUCING MOLDINGS FROM CHEMICAL COMPONENTS WHICH REACT QUICKLY WITH ONE ANOTHER

BACKGROUND OF THE INVENTION

This invention relates to a machine for producing moldings from chemical components which react quickly with one another, more particularly from chemical components which form polyurethane foam, but also from such components as, for example, unsaturated polyesters, epoxide resin, ε-caprolactam and co-polymers thereof. The resulting moldings consist predominantly of foam or structural foam, although they can also be solid.

Machines of the kind in question consist of a mold having an associated mixing chamber for the components which, at its outlet end, communicates with the mold cavity, optionally through a sprue, while the mold dividing plane extends through the mixing chamber and through the sprue, if present. The reaction components are stored in storage containers having pipes provided with pumps which lead off from the storage containers and open into the mixing chamber.

Machines of this kind are becoming increasingly more popular because, through incorporation of the mixing chamber into the mold, there is no need for the mixing chamber to be cleaned. The residue of the fully reacted mixture in the mixing chamber can be removed at the same time as the molding is removed from the mold. This is possible because the mixing chamber is arranged on the mold-dividing plane.

Mixing in the mixing chamber generally takes place in the usual way by spraying. No stirring mechanism is used because this would create difficulties in removing the residue of mixture in the mixing chamber from the mold.

It has been found that countercurrent mixing or countercurrent injection by means of nozzles, the mixing technique normally used, does not guarantee adequate admixture. As a result, the completed molding is left with streaks and layer effects which spoil the visible surfaces of the molding, but most important can have an adverse effect upon its physical properties.

SUMMARY OF THE INVENTION

The object of the present invention is to provide a machine which guarantees effective admixture of the components so that the finished molding is free from streaks and layer effects both on its surface and in cross section. In this way, the resulting molding has good physical properties and is provided with a visible surface free of faults.

According to the invention, this object is achieved by the provision between the mixing chamber and the mold cavity of a remixing system which consists of an arrangement of branches and junctions, the dividing plane extending through this remixing system so that the mixture residue which has fully reacted in the remixing system, in the mixing chamber and in the sprue, if present, can be removed from the mold as a unit together with the molding. The mixing system as a whole is either designed for attachment to the mold or is integrated in the mold.

The reaction mixture is effectively homogenized by the provision of a remixing system of this kind between the mixing chamber and the mold cavity.

In one particular embodiment, the branches and junctions of the remixing system consist of an arrangement of grooves. Grooves of this kind can be formed simply by milling them into the mold-dividing plane or, in the case of cast molds, by forming them at the casting stage.

The individual branches and the individual junctions preferably vary in cross sections. In this way, it is possible to obtain increased mixing effects.

In another embodiment, the remixing system is formed by chicanes arranged in a channel. In this case, too, the channel can be milled out of solid material in such a way that the chicanes are left standing. In the case of cast molds, they can also be directly cast on. However, chicanes of the kind in question can also be welded or screwed on. The advantage of screwed-on chicanes is that they are replaceable. In this embodiment, the branches and junctions extend between the chicanes.

In one particular embodiment, the remixing system is arranged in one half of the mold, the other half of the mold forming a tangent to, and covering, it. In this embodiment, only one surface has to be machined in the dividing plane of the mold, especially in cases where the mixing chamber and sprue, if present, are also arranged in the same half of the mold, while the other half of the mold again forms a tangent to and covers these parts.

In one particularly advantageous embodiment of the machine according to the invention, the remixing system extends over both halves of the mold in that a distributing channel having an associated collecting channel leads off from the mixing chamber in each half of the mold and several mixing channels extend from the distributing channel to the collecting channel, the channels in both halves of the mold being arranged relative to one another in such a way that the mixing channels of the one half of the mold cross over those of the other half of the mold. In this embodiment, a mixing effect is obtained not only through the branches (distributing and mixing channels) and junctions (collecting and mixing channels), but also by the contact surfaces at the intersections of the mixing channels.

The cross section of the mixing channels of one mold half preferably decreases from the distributing channel to the collecting channel, while the cross section of the mixing channels of the other half of the mold increases from the distributing channel to the collecting channel. The change in cross section is achieved for example through changes in the width and/or depth of the mixing channels. It is possible in this way to obtain a relatively uniform flow with a transfer of the material in layers from the narrowing mixing channels into the widening mixing channels.

The mixing channels can also be conical in shape so that an overflow of some of the material into the crossing mixing channel is always guaranteed.

In another particular embodiment, the mixing channels have the same cross-sectional area, but differ in depth and width, over their length. This prevents pressure surges in the remixing system while, at the same time, guaranteeing the transfer of a thin layer of the mixture from the flattening mixing channels into the deepening mixing channels at the intersections, as seen in the direction of flow.

In another particular embodiment, the remixing system is arranged in the sprue. In this way, it is possible in some cases to reduce overall length.

It is advantageous for the remixing system to be in the form of a replaceable insert. In cases where, for example, components or mixtures differing greatly in their viscosity are used, the insert can readily be changed and another insert with a remixing system optimally designed for the particular application envisaged can be introduced. Naturally, only one insert is required in cases where the remixing system is arranged in only one half of the mold. In the other case, the insert as a whole consists of two separate inserts so that one insert can be introduced into each half of the mold.

Finally, in another particular embodiment, the remixing system consists of several sections which may be identical to or different from one another in shape. These individual sections can also be in the form of inserts so that optimum mixing conditions can be obtained by replacing the inserts in sections.

Several exemplary embodiments of the machine according to the invention are illustrated purely diagrammatically in the accompanying drawing and described in detail in the following.

DESCRIPTION OF THE PREFERRED EMBODIMENTS

Figure 1:
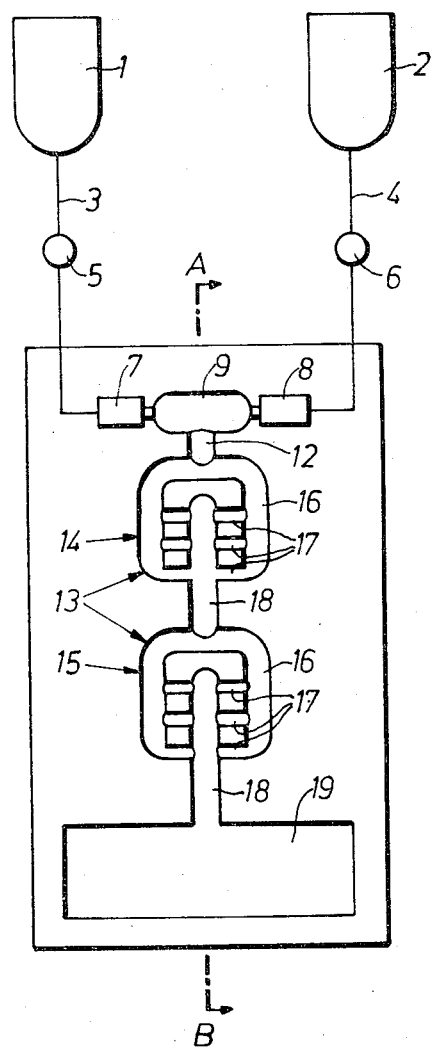
FIG. 1 is a longitudinal section through a first embodiment of the machine according to the invention with the attachments diagrammatically illustrated.
Figure 2:
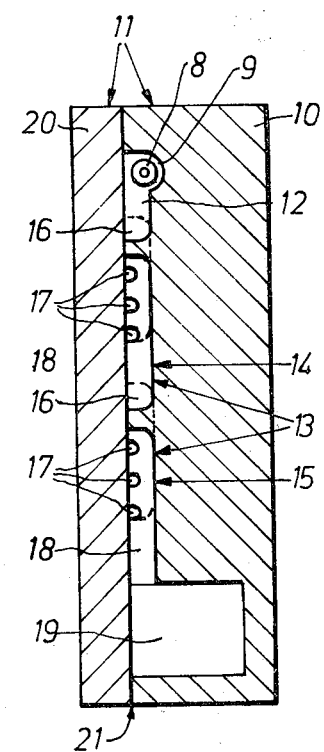
FIG. 2 is a section on the line A–B in FIG. 1, but without the attachments and including a lower mold half.

Referring now to the drawings:

In FIGS. 1 and 2, the chemical components are stored in storage containers 1,2. They flow through pipes 3,4, in which pumps 5,6 are installed, to injection nozzles 7,8 which open into a mixing chamber 9. The mixing chamber 9 is arranged in the upper half 10 to a mold 11. Its outlet 12 leads to a remixing system 13 consisting of two sections 14,15. The individual sections 14,15 comprise branches 16 and junctions 17,18. The junction 18 of the section 15 opens directly into the mold cavity 19. The lower half 20 of the mold is completely even towards the mold dividing plane 21 and tightly covers the upper half 10 of the mold when the mold is closed. In other words, the mold-dividing plane 21 forms a tangent to the mixing chamber 9, the remixing system 13 and the mold cavity 19 in such a way that the molding and the fully reacted residue of mixture left in the remixing system 13 and the mixing chamber 9 can be removed from the mold in the form of a single unit.

Figure 3:
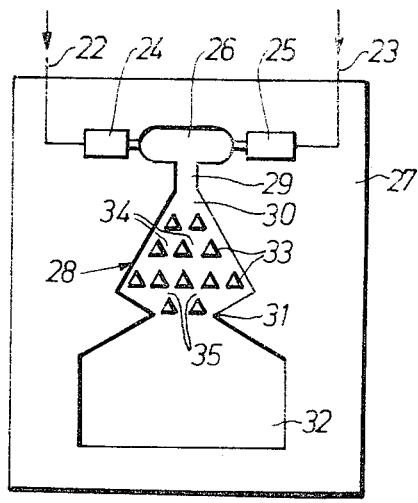
FIG. 3 is an elevation of the mold-dividing plane of one half of the mold according to a second embodiment.

In FIG. 3, pipes 22,23 lead to injection nozzles 24,25 which open into a mixing chamber 26. The mixing chamber 26 is arranged in the upper half 27 of the mold. An outlet 29 of the chamber 26 opens into a sprue 30. The sprue 30 has a constriction 31 and finally opens into a mold cavity 32. Chicanes 33 between which extends branches 34 and junctions 35, are arranged in the sprue 30 between the outlet 29 and the constriction 31. This section forms a remixing system 28. The lower half of the mold is not shown, corresponding to that of the embodiment illustrated in FIGS. 1 and 2.

Figure 4:
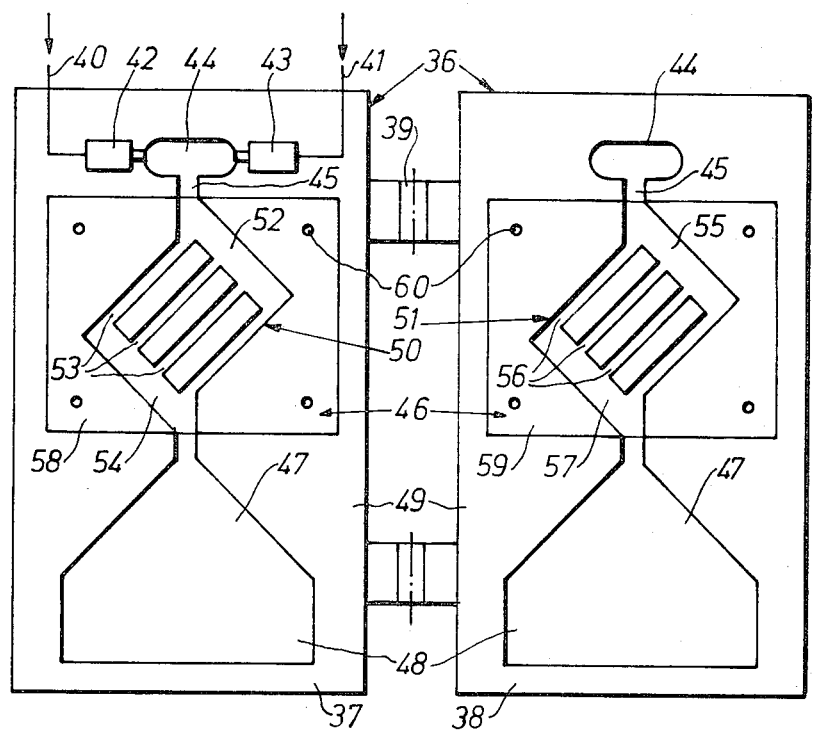
FIG. 4 is an elevation of the mold-dividing plane of the mold according to a third embodiment.

In FIG. 4, the mold 36 is shown open. In the interests of clarity, the upper half 37 and the lower half 38 of the mold are joined by hinges 39. The components are delivered through pipes 40,41 which terminate in injection nozzles 42,43. These injection nozzles open into a mixing chamber 44 arranged partly in the upper half 37 and partly in the lower half 38 of the mold. Its outlet 45, the following remixing system 46, the sprue 47 and the mold cavity 48 are traversed by the mold-dividing plane 49. The remixing system 46 consists of two sections 50,51 of substantially identical structure. The section 50 is arranged in the upper half 37 and the section 51 in the lower half 38 of the mold. In the section 50, the outlet 45 opens into a distributing channel 52 from which several mixing channels 53 branch and open into a collecting channel 54. The section 51 consists similarly of a distributing channel 55, mixing channels 56 and of a collecting channel 57. When the mold 36 is closed, the mixing channels 53 of the section 50 and the mixing channels 56 of the section 51 cross over one another. The distributing channel 52 and the collecting channel 54 of the section 50 lie outside the range of the outer mixing channels 56 of the section 51. Accordingly, the distributing channel 55 and the collecting channel 57 of the section 51 lie outside the range of the outer mixing channels 53 of the section 50. The cross section of the mixing channels 56 increases from the distributing channel 55 to the collecting channel 57 to the same extent as the cross section of the mixing channels 53 decreases from the distributing channel 52 to the collecting channel 54. In this way, a layer is transferred from the narrowing mixing channel to the other widening channel at each intersection of the mixing channels 53 and 56. The sections 50 and 51 of the remixing system 46 are in the form of replaceable inserts 58,59 designed to be introduced into the mold halves 37, 38. they are fixed to the mold halves 37,38 by means of screws 60.

What is claimed is:

1. An apparatus for producing moldings from chemical components which react quickly with one another, comprising a mold having an associated mixing chamber for reaction components which, at its outlet end, communicates with a cavity in said mold, means for introducing the said chemical components into the mixing chamber and a remixing system arranged between the mixing chamber and the mold cavity and adapted to homogenize the reaction mixture; said remixing system comprising a distributing channel with which a collecting channel is associated disposed in each half of the mold and leading from the mixing chamber portion in each half of the mold, and one or more mixing channels extending from each distributing channel to its associated collecting channel, the mixing channels of each mold half being so arranged that they cross over the mixing channels of the other mold half and being so constructed that the cross sections of the mixing channels of one mold half decrease from their distributing channel to their collecting channel while the cross-sections of the mixing channels of the opposite mold half increase from their distributing channel to their collecting channel; the assemblage being so constructed that the dividing plane dividing the mold into halves extends through the mixing chamber and the remixing system.

2. An apparatus as claimed in claim 1, wherein the remixing system is in the form of a replaceable insert.

3. An apparatus as claimed in claim 1, wherein the cross section of the mixing channels is changed by changing the depth and/or width of the mixing channels.

4. An apparatus for producing moldings from chemical components which react quickly with one another, comprising a mold having an associated mixing chamber for reaction components which, at its outlet end, communicates with a cavity in said mold, means for introducing the said chemical components into the mixing chamber and a remixing system arranged between the mixing chamber and the mold cavity and adapted to homogenize the reaction mixture; said remixing system comprising a distributing channel with which a collecting channel is associated disposed in each half of the mold and leading from the mixing chamber portion in each half of the mold, and one or more mixing channels extending from each distributing channel to its associated collecting channel, the mixing channels of each mold half being so arranged that they cross over the mixing channels of the other mold half and being so constructed that while the mixing channels maintain constant cross-sections their depths and widths vary along their lengths; the assemblage being so constructed that the dividing plane dividing the mold into halves extends through the mixing chamber and the remixing system.

5. An apparatus as claimed in claim 4, wherein the remixing system is in the form of a replaceable insert.

6. An apparatus for producing moldings from chemical components which react quickly with one another, comprising a mold having an associated mixing chamber for reaction components which, at its outlet end, communicates with a cavity in said mold, means for introducing the said chemical components into the mixing chamber and a remixing system arranged between the mixing chamber and the mold cavity and adapted to homogenize the reaction mixture; said remixing system comprising a distributing channel with which a collecting channel is associated disposed in each half of the mold, and more than one mixing channel extending from each distributing channel to its associated collecting channel, the mixing channels of each mold half being so arranged that they cross over the mixing channels of the other mold half and being so constructed that any one mixing channel has a lesser cross-section than that of either its associated distributing or collecting channel; the assembly being so constructed that the dividing plane dividing the mold into halves extends through the mixing chamber and the remixing system.

7. An apparatus as claimed in claim 6, wherein the remixing system is in the form of a replaceable insert.

8. An apparatus for producing moldings from chemical components which react quickly with one another comprising a mold having an associated mixing chamber for reaction components which, at its outlet end, communicates with a cavity in said mold, means for introducing the said chemical components into the mixing chamber and a remixing system arranged between the mixing chamber and the mold cavity and adapted to homogenize the reaction mixture; said remixing system comprising at least one distributing channel which has two approximately parallel branches which are each connected to a collecting channel by more than one mixing channel, each mixing channel having a cross-section less than the cross-section of its associated distributing channel branch and being so arranged that a stream of reactants issuing from its exit will impinge upon a stream from the exit of a mixing channel connecting the other distributing channel branch to the collecting channel; the assembly being so constructed that the dividing plane dividing the mold into halves extends through the mixing chamber and the remixing system.

9. The apparatus of claim 8 wherein the mixing channels are at approximately right angles to the collecting channel and each mixing channel enters the collecting channel opposite the entrance of a mixing channel connecting the collecting channel with the branch of the distributing channel with which said first mixing channel is not associated.

10. The apparatus of claim 8, wherein the remixing apparatus comprises two successive distributing channels, each with its associated mixing and collecting channels arranged such that the collecting channel associated with the first distributing channel exits into the second distributing channel.

11. An apparatus as claimed in claim 8, wherein the remixing system is in the form of a replaceable insert.

12. An apparatus as claimed in claim 8, wherein the remixing system is arranged in one half of the mold and the other half of the mold forms a tangent to, and covers it.

* * * * *